May 24, 1966  A. SILVER ETAL  3,252,326
SINE FUNCTION VECTOR BALANCE TRANSDUCER
Filed Aug. 8, 1963  4 Sheets-Sheet 1
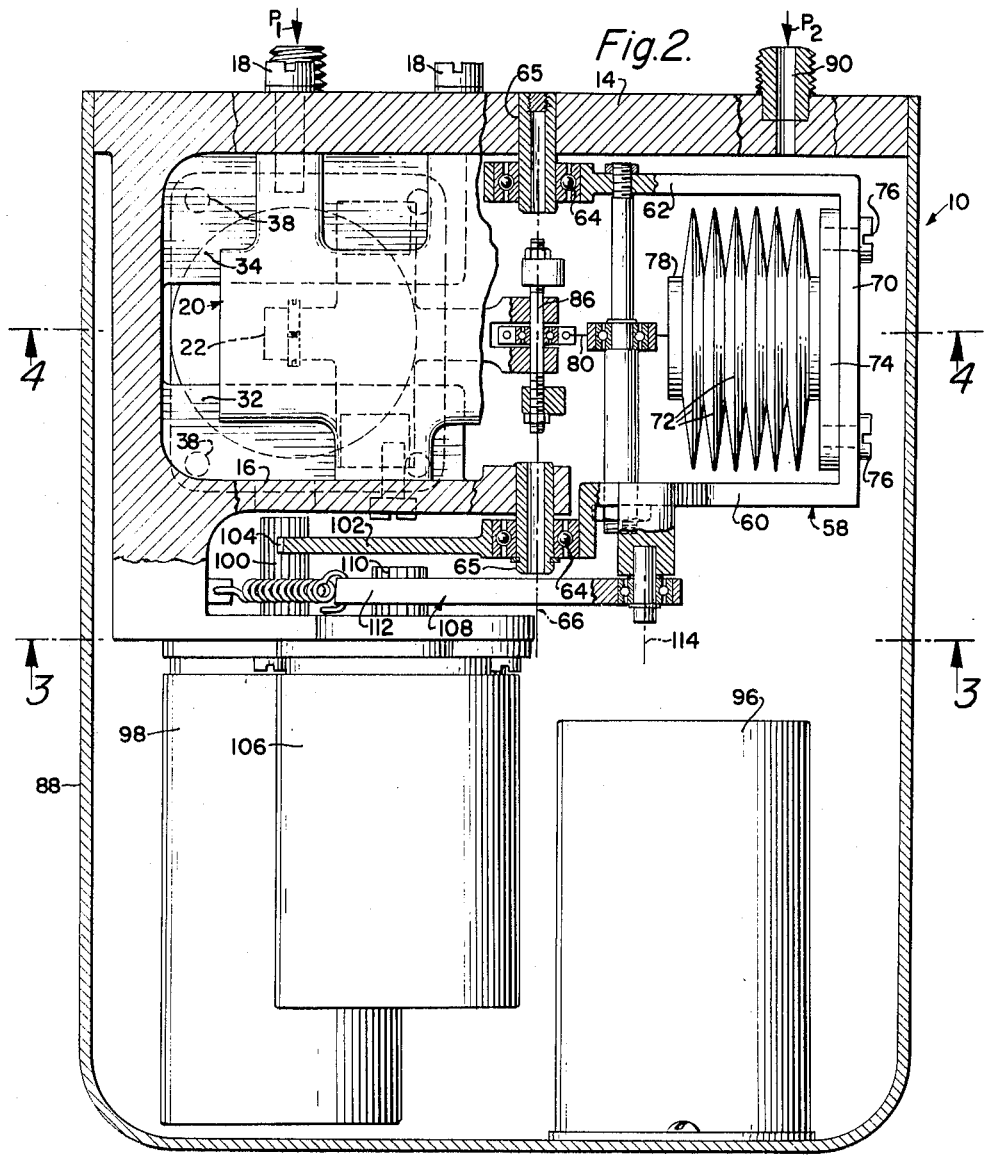
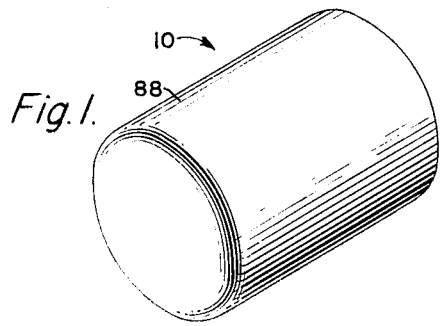
EDWARD F. ABRAMS,
JAMES E. CHAPMAN,
WILLIAM C. PLUNK,
ALEXANDER SILVER,
INVENTORS.
BY
Attorney.

May 24, 1966  A. SILVER ETAL  3,252,326
SINE FUNCTION VECTOR BALANCE TRANSDUCER
Filed Aug. 8, 1963  4 Sheets-Sheet 2

EDWARD F. ABRAMS,
JAMES E. CHAPMAN,
WILLIAM C. PLUNK,
ALEXANDER SILVER,
INVENTORS.

BY Donald R. Nyhagen

Attorney.

May 24, 1966  A. SILVER ETAL  3,252,326
SINE FUNCTION VECTOR BALANCE TRANSDUCER
Filed Aug. 8, 1963  4 Sheets-Sheet 3
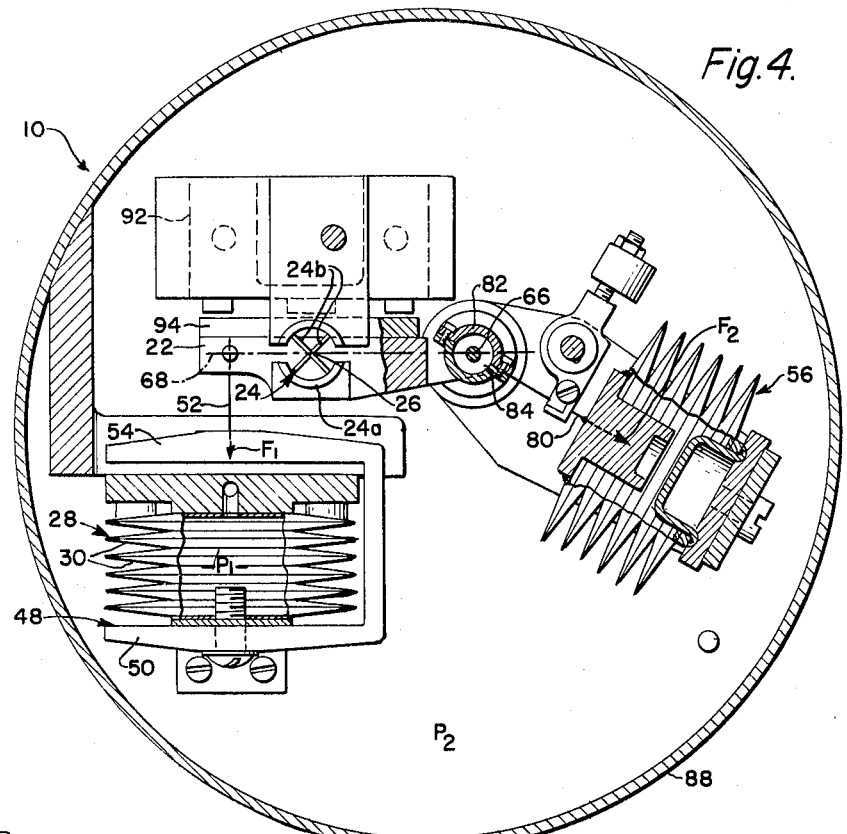
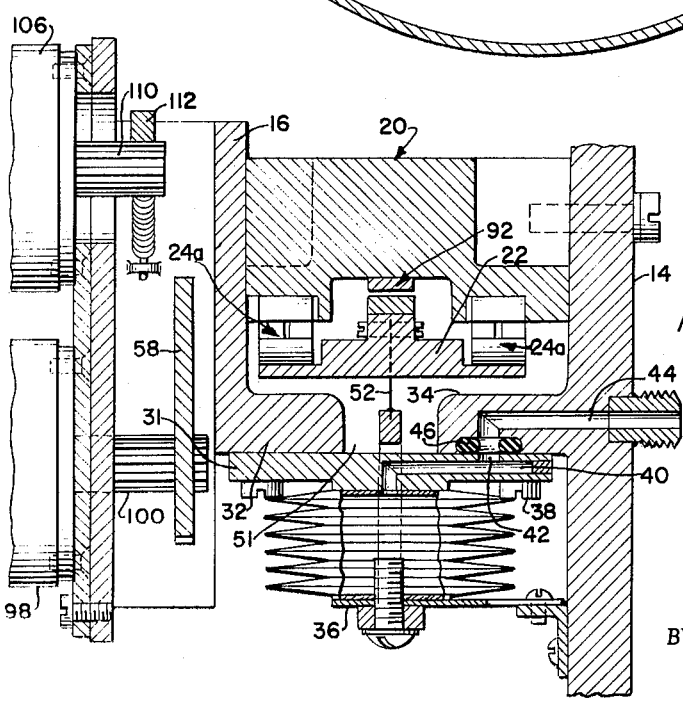
EDWARD F. ABRAMS,
JAMES E. CHAPMAN,
WILLIAM C. PLUNK,
ALEXANDER SILVER,
INVENTORS.
BY
Attorney.

May 24, 1966  A. SILVER ETAL  3,252,326
SINE FUNCTION VECTOR BALANCE TRANSDUCER
Filed Aug. 8, 1963  4 Sheets-Sheet 4

EDWARD F. ABRAMS,
JAMES E. CHAPMAN,
WILLIAM C. PLUNK,
ALEXANDER SILVER,
INVENTORS.

BY

Attorney.

United States Patent Office 3,252,326
Patented May 24, 1966

3,252,326
SINE FUNCTION VECTOR BALANCE TRANSDUCER
Alexander Silver, Tarzana, William C. Plunk, San Pedro, Edward F. Abrams, Los Angeles, and James E. Chapman, Palos Verdes Estates, Calif., assignors to The Garrett Corporation, Los Angeles, Calif., a corporation of California
Filed Aug. 8, 1963, Ser. No. 302,231
7 Claims. (Cl. 73—407)

This invention relates generally to force balance instruments of the balanced beam type. The invention relates more particularly to a force balance instrument of this type wherein the instrument beam is restored to balance in response to a change in a force being monitored by adjusting the angle between the longitudinal axis of the beam and the line of action of one of the forces active on the beam.

Force balance instruments of the balanced beam type are well known in the art and are commonly employed to monitor or measure fluid pressures and fluid pressure ratios. A typical force balance instrument is equipped with a balance beam rockably supported on a fulcrum, means for applying opposing forces to the beam in such manner that the forces produce opposing moments on the beam, and means for regulating the balance of the beam. Generally, the instrument is equipped with feed-back means for operating the balancing means automatically in response to displacement of the beam from its neutral position, thereby to normally maintain the beam in balance in its neutral position.

In the existing force balance instruments, the beam is balanced either by shifting the fulcrum lengthwise of the beam so as to regulate the relative lever arm lengths of the forces active on the beam or by regulating the magnitude of one of the forces. While these existing instruments are capable of satisfactory operation in many applications, they possess certain inherent deficiencies. The existing instruments, for example, are excessively complex in construction and costly to manufacture. The existing instruments also have a relatively low inherent accuracy; that is to say, manufacture of the existing instruments involves a large number of machining and assembly operations which must be performed with a very high degree of precision to attain the high over-all instrument accuracy demanded in many force monitoring or measuring applications. Further, the existing instruments are difficult to counterbalance with sufficient accuracy to provide the instruments with triaxial insensitivity to environmental acceleration forces. Finally, the existing instruments possess relatively low environment resistance, that is, the instruments are prone to damage by relatively low order environmental acceleration forces.

In the case of the existing force balance instruments with movable fulcrums, the foregoing deficiencies result primarily from the movable carriage and rails which are required to support the fulcrum for movement along the beam and which are extremely difficult to machine and assemble with sufficient precision to provide the instruments with high over-all operational accuracy. Moreover, even though initially fabricated with sufficient precision to attain such high accuracy, the fulcrum supporting carriage and rails have low environmental resistance.

Co-pending application, Serial No. 287,685 filed June 13, 1963, and entitled, Pressure Altitude Vector Balanced Transducer, discloses a force balance instrument of the balanced beam type which overcomes the foregoing and other deficiencies of the existing force balance instruments. In the force balance instrument of this co-pending application, the balance beam is restored to balance in its neutral position in response to a change in a monitored force by regulating the angle between the line of action of one force active on the beam and the longitudinal axis of the beam, thereby to adjust the moment produced on the beam by the latter force. The movable fulcrum carriage and supporting rails of the existing force balance instruments are thereby eliminated and all motions are rotary motions, whereby, for the same accuracy, the force balance instrument of the co-pending application is less complex in construction, more economical to manufacture, and possesses greater environmental resistance than the existing instruments.

In the instrument under discussion, the pivotal balancing force is angularly positioned by a pivoted force balancing frame including a coaxial gear segment which meshes with a pinion on a rotary output shaft, whereby the angle of the shaft is related to the angle of the frame and thereby to the forces active on the balance beam. Because of the particular rotary drive connection between the force balancing frame and the rotary output shaft, the relationship between the angle of the shaft and the monitored force quantity is a sine function.

While such a sine function output is satisfactory for many applications of force balance transducers, in other applications it is desirable or essential to have a more linear relationship between the angle of the output shaft and the monitored force quantity.

A general object of the present invention is to provide a force balance instrument of the character described in which the output shaft of the instrument is driven from the pivotal force balancing frame in a new and unique way, whereby the relationship between the angle of the output shaft and the force quantity being monitored by the instrument may be made to approach a linear function.

Other objects, advantages, and features of the invention will become apparent to those skilled in the art as the description proceeds.

Briefly, the objects of the invention are attained by providing a force balance instrument of the character described wherein the rotary output shaft of the instrument is drivably coupled to the pivotal force balancing frame by a drive connection which rotates the output shaft through an angle approximately equal to the product of a constant and the sine of the angle of rotation of the frame. This drive connection in effect "de-sines" the output of the transducer and effects positioning of the output shaft in such a way that the relationship between the angle of the shaft and the monitored force quantity, i.e. the ratio of the forces active on the beam, approaches a linear function. In one illustrative embodiment of the invention, the drive connection comprises a rack and eccentric pinion. In an alternative form of the instrument, the drive connection comprises a link and conversion cam gear set.

The invention will be better understood from the following detailed description taken in connection with the annexed drawings, wherein:

FIG. 1 is a perspective view of the case of the present force balance instrument;

FIG. 2 is an enlarged section through the instrument taken on line 2—2 in FIG. 3;

FIG. 4 is a section taken on line 4—4 in FIG. 2;

FIG. 5 is a section taken on line 5—5 in FIG. 3;

Figure 9:
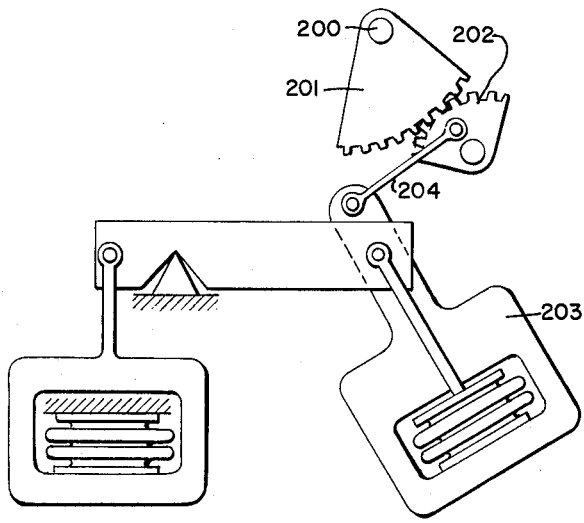

FIG. 9 diagrammatically illustrates an alternative form of the present force balance instrument.

The force balance instrument 10 illustrated in FIGS. 1–8 of these drawings comprises a frame 12 including spaced parallel side walls 14 and 16. Situated between these walls, and attached to the latter by bolts 18, is a supporting platform 20. Below the platform 20, as the instrument is viewed in FIG. 4, is a balance beam 22. Balance beam 22 is pivotally supported on the underside of the platform 20 by fulcrum means 24 for rocking on an axis 26 normal to the beam and to the frame side walls 14 and 16. While various types of fulcrum means may be used to support the balance beam, the fulcrum means 24 illustrated in the drawings are of the conventional flexure type and comprise separate fulcrum elements 24a each including crossed flexures 24b which are anchored at one end to the platform 20 and at the other end to the beam 22.

Operatively connected to one end of the balance beam 22 is a first force applying means 28. This force applying means comprises a flexible bellows 30, the upper end of which as it is viewed in FIG. 5, is sealed to the undersurface of a mounting plate 31. Mounting plate 31, in turn, seats against the under-surfaces of a pair of flanges 32 and 34 which project inwardly toward one another from the frame side walls 14 and 16. It will be observed that the flanges 32, 34 are spaced a distance below the supporting platform 20 to accommodate the balance beam 22 therebetween. The lower end of the bellows 30 is sealed by an end wall 36.

Bellows mounting plate 31 is secured to the frame flanges 32 and 34 by bolts 38 and is formed with a fluid passage 40 which opens at one end to the interior of the bellows 30. Passage 40 opens through the upper surface of the mounting plate 31 via a port 42. Port 42 registers with one end of a fluid passage 44 in the frame flange 34, the other end of which latter passage opens through the outer surface of the frame side wall 14 for communication to a fluid source to be monitored. A seal ring 46 seals the flange 34 to the bellows mounting plate 31 about the port 42 and passage 44.

Bellows 30 is encompassed by an open rectangular frame 48, the lower cross member 50 of which is attached to the lower wall 36 of the bellows. The upper end of the bellows frame 48 projects through the space 51 between the frame flanges 32, 34 and is connected to the balance beam 22 by a wire flexure 52 which is anchored at one end to the upper cross member 54 of the bellows frame 48 and at the other end to the adjacent end of the beam. It is evident, therefore, that fluid pressure in the bellows 30 creates on the beam 22 a force which produces a counterclockwise moment on the beam as the latter is viewed in FIG. 4.

Generally denoted by the numeral 56 is a second force applying means, or force balancing means, which exerts on the balance beam 22 a second force which produces a clockwise moment on the beam opposing the counterclockwise moment produced by the bellows 30. Force balancing means 56 comprises a frame or sector 58 including spaced arms 60 and 62 having coaxial bores in which are fixed the outer races of ball bearings 64. The inner races of these bearings are fixed on coaxial shafts 65 which are mounted in the instrument frame walls 14 and 16 on a common axis 66 located in a plane 68 containing the pivot axis 26 of the balance beam 22. Sector 58 is thus pivotally mounted on the instrument frame 12 for turning on the axis 66.

The arms 60 and 62 of the sector 58 are joined by a cross member 70. Located between the sector arms is a flexible bellows 72 having a mounting plate 74 seating against the sector cross member 70 and attached to the latter by bolts 76. The opposite end of the bellows 72 is sealed by an end wall 78 to which is anchored one end of a wire flexure 80. The opposite end of the flexure 80 is anchored to a bearing retainer ring 82 situated in a slot in the adjacent end of the balance beam 22. Retainer ring 82 has a bore therethrough in which is fixed the outer race of a ball bearing 84. The inner race of this bearing is fixed to a shaft 86 carried by the balance beam. Shaft 86 is located so that in one position of the balance beam, hereinafter referred to as its neutral position, the shaft is coaxial with the sector pivot axis 66.

The entire force balance instrument 10 is enclosed in a hermetic case 88 which is sealed to the instrument frame wall 14. Extending through the latter wall and opening to the interior of the case 88 is a fluid passage 90 adapted for communication to a source of a second fluid pressure to be monitored. Bellows 72 on the sector 58 is evacuated and exposed to the internal pressure in the case. Bellows 30, of course, is also exposed to the internal pressure in the case.

Figure 6:
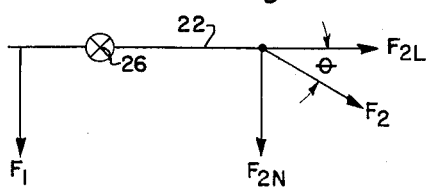
FIG. 6 is a force diagram illustrating the forces active on the balance beam of the instrument.

Referring to FIGS. 4 and 6, it is evident that if we assume the pressure $P_1$ in the bellows 30 exceeds the pressure $P_2$ in the instrument case 88, the bellows 80 exerts on the balance beam 22 a force $F_1$ which produces a counter-clockwise moment on the beam. As a consequence of the internal case pressure $P_2$ on the evacuated bellows 72, the latter exerts on the beam a force $F_2$ which produces on the beam a clockwise moment opposing the moment produced by bellows 30. The force $F_2$ exerted by the bellows 72 can be resolved into two components, one ($F_{2n}$) acting normal to the beam and the other ($F_{2l}$) acting longitudinally of the beam. Only the normal force component $F_{2n}$ is effective to produce a clockwise moment on the balance beam 22. This normal force component, moreover, is a sine function of the bellows force $F_2$, or, in other words $$F_{2n} = F_2 \sin \theta$$

where $\theta$ is the angle between the longitudinal axis of the balance beam and the line of action or vector of the force $F_2$. Thus, for any given value of the force $F_2$, corresponding to a particular pressure $P_2$ in the instrument case 88, the clockwise moment produced on the balance beam 22 by the bellows 72 is varied by adjusting the angle $\theta$, the moment increasing as the angle increases and decreasing as the angle decreases.

Adjustment of the angle $\theta$ is effected by rotating the sector 58, thereby to angularly adjust the bellows 72 with respect to the balance beam 22 about the pivotal connection, i.e. shaft 86, between the beam and the bellows 72. It is evident, therefore, that the beam 22 may be balanced in the neutral position, or restored to balance in its neutral position, by properly angularly positioning the bellows 72 by rotation of the sector 58.

As is customary in force balance instruments of the balanced beam type, the balance beam 22 in the present instrument 10 is automatically maintained in balance. To this end, there is mounted on the supporting platform 20 of the instrument a differential transformer 92, the armature 94 of which is fixed to the balance beam. Transformer 92 generates an electrical feed-back signal, in the well known way, the phase and amplitude of which is related to the displacement of the balance beam 22 from its neutral position. Coupled to the transformer 92 is a servo amplifier 96 for amplifying the feed-back signal. The output of this amplifier, in turn, is coupled to a reversible servo-motor 98. The amplifier and the servomotor are mounted within the instrument case 88 in the positions shown.

The shaft of the servomotor 98 turns on an axis parallel to the turning axis 66 of the sector 58 and mounts a pinion 100. Sector 58 includes a coaxial sector plate 102 integral with the sector arm 60 and formed along its curved edge with gear teeth 104 which mesh with the gear on the motor shaft pinion 100. Thus, the sector 58 can be rotated by motor 98, in either direction on the axis 66, to adjust the angle $\theta$ between the longitudinal axis of the balance beam 22 and the direction line of the force $F_2$ exerted on the beam by the sector bellows 72, thereby to balance the beam in its neutral position, as explained earlier.

Also mounted within the instrument case 88 is a synchrogenerator 106, the shaft of which turns on an axis parallel to the sector turning axis 66. The synchro shaft is drivably connected with the sector 58 by a drive connection 108, which is effective to position the shaft as discussed below, so that an approximately linear relationship exists between the angle of the shaft and the force quantity monitored by the instrument, which is the pressure ratio $P_1$. The drive connection 108 illustrated comprises a pinion 110 on the shaft of synchro 106 and a rack 112 which meshes with the pinion and is pivotally attached to the sector 58 on an axis 114 parallel to, and laterally displaced from, the pivot axis of the sector. Energizing leads for the amplifier 96 and output leads from the synchro 106 are brought to the exterior of the instrument case 88.

In operation, fluid pressure $P_1$ from one source is admitted to the bellows 30 through passage 44 and fluid pressure $P_2$ from a second source is admitted to the interior of the instrument case through passage 90. As a result of the action of these fluid pressures on the bellows 30 and 72, the latter exert on the balance beam 22 forces $F_1$ and $F_2$ which produce opposing moments on the beam. Displacement of the beam from its neutral position in response to a change in the relative magnitude of the pressures $P_1$ and $P_2$ causes the differential transformer 92 to generate a feed-back signal related to the direction and magnitude of the displacement. This signal is amplified by the amplifier 96 and energizes the servomotor 98 in a direction to rotate the sector 58 in the proper direction to restore the beam to balance in its neutral position.

Rotation of the sector of the servomotor to thus balance the beam drives the shaft of the synchro 106 in rotation through the rack and pinion drive connection 108. The synchro shaft is therefore angularly positioned in relation to the angular position of the sector 58. The synchro, in turn, generates an electrical signal related to the angular position of the synchro shaft. The rack and pinion drive connection between the sector and the synchro shaft is so arranged that the synchro output is related to the ratio of the pressures $P_1$ and $P_2$ by a function which approaches a linear function.

Figure 3:
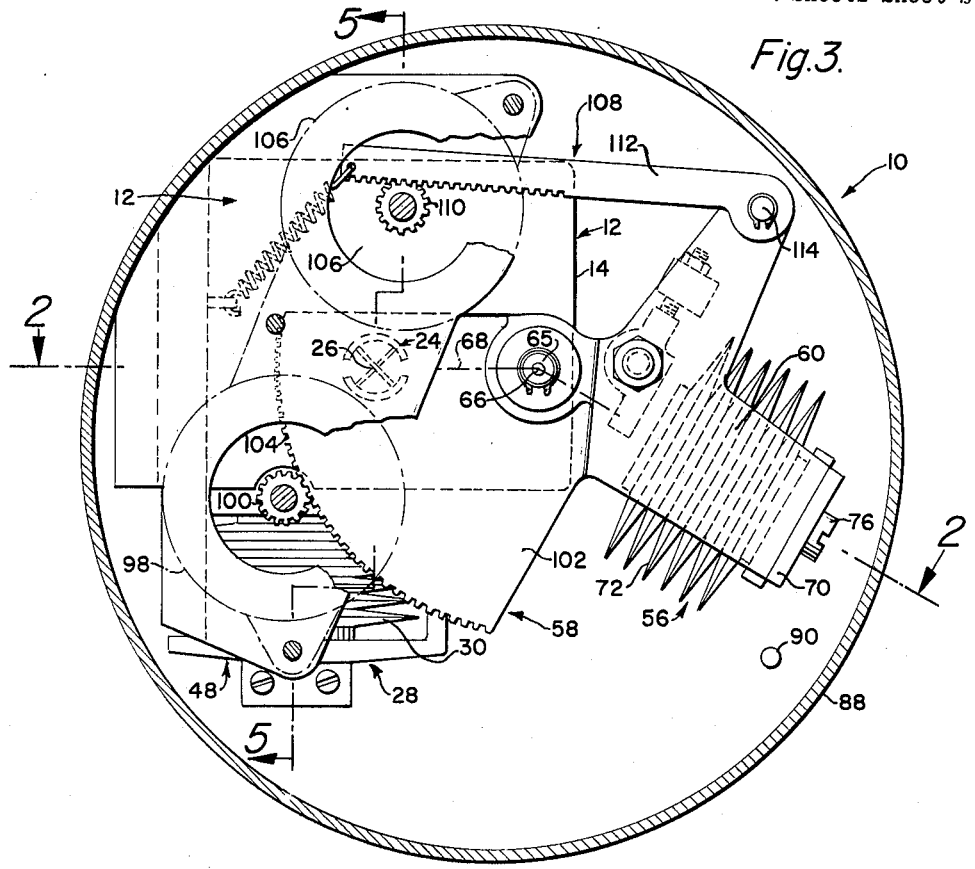
FIG. 3 is a section taken on line 3—3 in FIG. 2.
Figure 7:
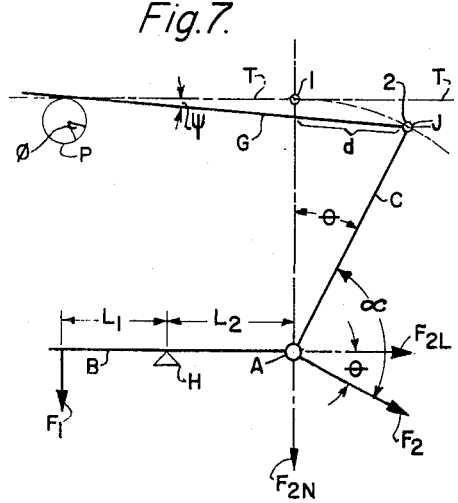
FIG. 7 is a simple line diagram simulating certain actions which occur in the instrument.

To understand how such a linear output function is attained, reference is made first to the line of diagram of FIG. 7. In this figure, C represents a crank of length $R_1$ which turns on an axis A, P represents a pinion of pitch diameter $R_2$, and G represents a gear rack which is pivotally attached at one end to the outer end of the crank C and meshes with the pinion P for driving the latter in rotation upon longitudinal movement of the rack. Assume that the crank C rotates between a first limiting position 1, represented by the phantom crank line in FIG. 7, normal to a line of tangency T to the pitch circle of pinion P, and a second limiting position 2, represented by the solid crank line. It is obvious that during rotation of the crank C from position 1 to position 2, the pivotal connection J between the rack G and the crank C travels along the circular path of motion indicated.

Let us define the position occupied by the rack G, when the crank C occupies the initial position 1, as the initial rack position, and the angular position occupied by the pinion, when the rack occupies its initial position, as the initial pinion position. Let us further define that when the crank is rotated through an angle $\theta$ from its initial position, the rack is displaced longitudinally a distance $d$ and rotated through a small angle $\psi$, and the pinion is rotated through an angle $\phi$ as a consequence of the longitudinal displacement and rotation of the rack.

It is evident that as a result of rotation of the rack G through the small angle $\psi$ during rotation of crank C through the angle $\theta$, the angle between the crank and the phantom position line 1 diminishes from a right angle at position 1 to slightly less than a right angle at the crank angle $\theta$. It is further evident that the rotation of pinion P through the angle $\phi$ results to a minor extent from rotation of rack G through the angle $\psi$ but primarily from the longitudinal displacement $d$ of the rack. In the interest of simplification, let us assume that the rack G remains normal to the phantom crank position line 1 during rotation of the crank C throughout its entire angle of rotation from the position 1 to position 2, whereby the angle $\psi$ is zero and the pinion rotation angle $\phi$ is a function only of the longitudinal rack displacement $d$. The error resulting from this assumption is small if the angle $\theta$ is small and can be reduced, of course, by increasing the space between the pinion P and the crank axis A and by increasing the crank length.

Under the foregoing conditions, it is obvious that the following relationships exist:

$$d \cong R_1 \sin \theta \tag{1}$$

$$\phi \cong \frac{180d}{\pi R_2} \tag{2}$$

Combining Equations 1 and 2 we obtain $$\phi = \frac{180 R_1}{\pi R_2} \sin \theta \cong K_1 \sin \theta \tag{3}$$

Equation 3 demonstrates that under the assumptions discussed above, the angle of rotation $\phi$ of the pinion P is a sine function of the angle $\theta$ of rotation of the crank C.

Returning now to FIG. 7, assume that B denotes a balance beam which is fulcrumed at H and on one end of which is exerted a force $F_1$. Assume further that a second force $F_2$ is exerted on the beam, in opposition to force $F_1$, along a line of action disposed at a fixed angle $\alpha$ with respect to the crank C, such that rotation of the crank through the angle $\theta$ from its initial position 1 rotates the line of action of force $F_2$ through the angle $\theta$ with respect to the beam B from an initial position longitudinal of the beam. Assume finally, that the beam has a neutral position, shown, wherein the axis about which the line of action of force $F_2$ is thus rotated with respect to the beam is coincident with the pivot axis A of crank C, and that the beam is balanced in its neutral position when the crank and line of action of force $F_2$ occupy their solid line positions at the angle $\theta$ with respect to their initial positions.

It is obvious that under these latter conditions, the following relationships exist:

$$F_1 l_1 = F_{2n} l_2 \tag{4}$$

Where $F_{2n}$ is the component of the force $F_2$ which is normal to the beam B and thereby effective to oppose and balance force $F_1$. Equation 4 can obviously be rewritten as:

$$F_1 l_1 = l_2 F_2 \sin \theta \tag{5}$$

or $$\sin \theta = \frac{l_1}{l_2} \left( \frac{F_1}{F_2} \right) = K_2 \left( \frac{F_1}{F_2} \right) \tag{6}$$

Combining Equations 3 and 6 we obtain:

$$\phi \cong K_1 K_2 \frac{F_1}{F_2} \cong K_3 \frac{F_1}{F_2} \tag{7}$$

Equation 7 clearly demonstrates that in a force balance instrument of the character diagrammatically illustrated in FIG. 7, wherein rotation of the crank C through any angle $\theta$ rotates the line of action of force $F_2$ through the same angle $\theta$ with respect to the balance beam B and drives the pinion P through the rack G through an angle $\phi$, and with the several assumptions discussed above, the angle $\phi$ of the pinion is a linear function of the ratio $F_1/F_2$ of the forces active on the beam when the latter is in balance in its neutral position.

A more rigorous and accurate mathematical analysis of the relationship between the pinion angle $\phi$ and the force ratio $F_1/F_2$ in a force balance instrument of the kind illustrated in FIG. 7 is too complex for presentation in this disclosure. Suffice it to say that such a rigorous analysis yields, in lieu of the simple linear Equation 7, an equation of the form:

$$\phi = E_1 \frac{F_1}{F_2} + E_2 \quad (8)$$

where $E_1$ and $E_2$ are, in effect, error factors which represent a departure of the relation between the pinion angle $\phi$ and the force ratio $F_1/F_2$ from a linear relation and comprise complex trigometric functions.

Accordingly, the force balance instrument arrangement of FIG. 7 does not yield as accurate a linear output function as is represented by Equation 7. The rigorous analysis of the instrument, however, further demonstrates that, other parameters being the same, for any given maximum value of the angle $\theta$ of rotation of crank C, the error factors $E_1$ and $E_2$ may be minimized, and the actual output function of the instrument, as represented by Equation 8, may be made to more nearly approach the ideal linear output function represented by Equation 7, by changing the angle $\alpha$ between the crank C and the line of action of force $F_2$, thereby to change the angle between the crank and rack G, when angle $\theta$ between said line of action and the longitudinal axis of the beam B is zero, as discussed below.

The force balance instrument 10 illustrated in FIGS. 1–5, described earlier, is essentially the same and operates in essentially the same way as the force balance instrument diagrammatically illustrated in FIG. 7. This is evident from a comparison of the latter figure and FIG. 8 which diagrammatically illustrates the force balance instrument of FIGS. 1–5. To aid in comparing these two instruments, both the reference numerals of FIGS. 1–6 and the reference letters of FIG. 7 have been applied to corresponding elements in FIG. 8.

Figure 8:
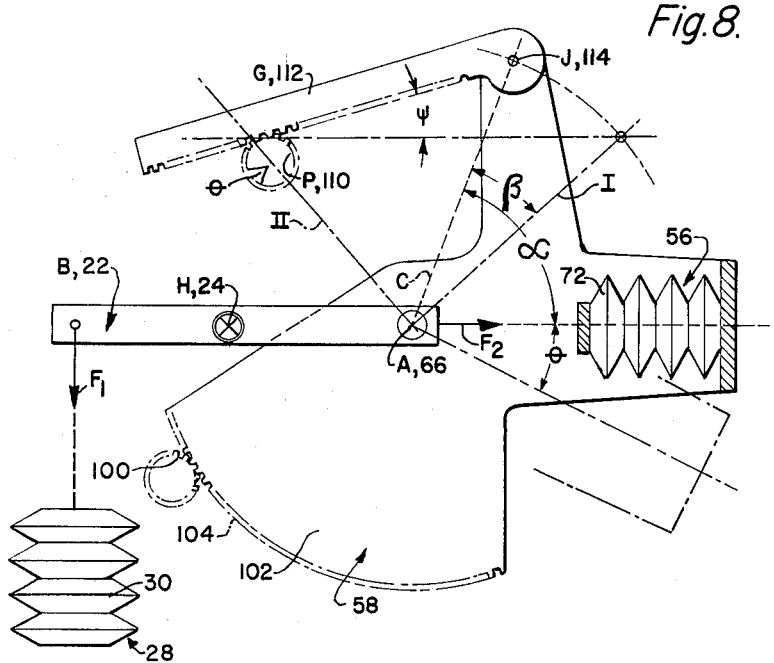
FIG. 8 is a diagrammatic illustration of the instrument of FIGS. 1–5.

Referring to FIG. 8, the effective crank arm C of the illustrated instrument is represented by the line joining the pivot axis A, 66 of the sector 58 and the pivot axis J, 114 of the pivoted connection between the rack G, 112 and the sector. The initial position of this crank arm is the position which it occupies when the axis of the bellows 72, and therefore the line of action of the force $F_2$ exerted by the bellows on the beam, are aligned with the longitudinal axis of the balance beam B, 22. In the particular force balance instrument illustrated in FIGS. 1–5, the maximum angle of rotation of the sector 58, and hence the maximum angle of rotation $\theta$ of the crank arm C, is on the order of between 30° and 45°.

The force balance instrument of FIGS. 1–5 was subjected to the rigorous mathematical analysis earlier discussed for purpose of determining the optimum angle at which the crank arm C should be disposed in its initial position to minimize the error factors $E_1$ and $E_2$ in the output function Equation 8 of the instrument and thereby obtain an actual output function which most nearly approaches the ideal linear output function represented by Equation 7. The datum which was used in these calculations for the initial crank angle measurement was a line I intersecting the pivot axis A, 66 of the crank and extending normal to a line II intersecting the latter axis and the rotation axis of the pinion P, 110. This rigorous mathematical analysis demonstrated that optimum initial crank angle $\beta$, measured between the crank arm C and the datum line I was on the order of 21°, as illustrated in the drawings. As already noted, the axis of bellows 72 extends longitudinally of the balance beam B, 22 when the crank C occupies this initial position, and the maximum angle of rotation $\theta$ of the crank and the axis of the bellows 72 from these initial positions is on the order of 30°–45°.

It is evident from FIG. 8, that the crank C, in its initial position, is not normal to the rack G, 112 as is the crank C in FIG. 7. Rather, the crank C in FIG. 8, when in its initial angular position, is disposed at an acute angle to the rack, the latter angle diminishing as the crank and bellows rotate through the maximum angle $\theta$. The underlying reasons for the reduction in the error factors $E_1$, $E_2$ as a result of the reduction in the initial angle between the crank and rack from a right angle in FIG. 7 to an acute angle in FIG. 8 can be fully understood only from the rigorous mathematical analysis of the instrument.

Suffice it to say that such analysis does show that for the particular instrument illustrated, the output function of the instrument most nearly approaches a linear function when the angle $\beta$ is on the order of 21°. The optimum value of the angle changes if any of the other parameters of the instrument, such as the length of the crank arm C or the spacing between the pinion P, 110 and the sector pivot axis A, 26, are changed. As already noted, the deviation of the output function of the instrument from a linear output function may be reduced by increasing the latter spacing, the length of the rack G, 112 and/or the length of the crank arm C.

It is evident from the description thus far and the drawings, particularly FIGS. 7 and 8, that if we assume the output shaft pinion P, 110 of the instrument comprises a simple circular pinion, the departure of deviation of the actual output function of the instrument, as represented by Equation 8 from the ideal linear output function of Equation 7 results to a large extent from the change in the rack angle $\psi$ which occurs with a change in the angle $\theta$ of the force balancing frame 58. It is further evident that the error thus introduced by the changing rack angle $\psi$ is such that during rotation of the frame 58, the relationship between the output shaft angle $\phi$ and the frame angle $\theta$ departs from the relationship defined by Equation 3, and necessary to yield a linear output function, the actual angle $\phi$ exceeding the ideal angle $\phi$ obtained from Equation 3 by an amount which increases as the angle $\theta$ increases and the actual angle $\phi$ being less than the ideal angle $\phi$ by an amount which diminishes as the angle $\theta$ diminishes.

According to a further important aspect of the invention this departure of relationship between the frame angle $\theta$ and the output shaft angle $\phi$ from that defined by Equation 3 is compensated for, thereby to cause the actual output function of the present instrument to more nearly approach the ideal linear function of Equation 7, by using for the output shaft pinion 110, the eccentric pinion shown. This eccentric pinion is shaped to introduce into the drive connection between the frame 58 and the output shaft of the instrument an output shaft angle correction factor or rotation angle which approximately offsets the departure, just discussed, of the relationship between the shaft angle $\phi$ and frame angle $\theta$ from the sine function of Equation 3, occasioned by the use of a simple coaxial pinion. It is obvious, therefore, that the linearity of the instrument may be maximized by properly shaping the eccentric pinion 110.

FIG. 9 diagrammatically illustrates an alternative means for rotatably driving the output shaft of the instrument from the pivotal force balancing frame. In this case, the output shaft 200 mounts an eccentric cam gear 201 which meshes with a second cam gear 202 rotatably mounted on the instrument frame. Cam gear 202 is connected to the pivoted force balancing frame 203 by a link 204, whereby the output shaft is driven in rotation by rotation of the frame 203. It is obvious that the cam gear set 201, 202 can be shaped to yield the same approximately linear output function as the eccentric pinion 110 in FIGS. 1–8. It is further obvious, of course, that the shapes of these pinions or gears may be varied to obtain other output functions.

Various other modifications in the design, arrangement of parts, and instrumentalities of the invention are possible within its spirit and scope.

We claim:
1. A force balancing instrument comprising:
a balance beam having a fulcrum;
a first force applying means operatively connected to said beam for exerting on the latter a first force which produces a first moment in one direction on the beam;
a pivoted frame mounted for rotation about an axis approximately parallel to the pivot axis of said beam;
a second force applying means operatively connected between said frame and beam for exerting on the latter a second force which produces a second moment on the beam opposing said first moment;
said frame being rotatable to adjust the angle between the longitudinal axis of said beam and the line of action of said second force, thereby to adjust said second moment;
a rotary output shaft; and
means drivably coupling said frame and shaft for effecting rotation of the latter with said frame approximately in accordance with the relationship $\phi = K \sin \theta$ where $\phi$ is the angle of rotation of said shaft, $\theta$ is the angle of rotation of said frame, and K is a constant.

2. A force balance instrument comprising:
a balance beam having a fulcrum;
a first force applying means operatively connected to said beam for exerting on the latter a first force which produces a first moment in one direction on the beam;
a pivoted frame mounted for rotation about an axis approximately parallel to the pivot axis of said beam;
a second force applying means operatively connected between said frame and beam for exerting on the latter a second force which produces a second moment on the beam opposing said first moment;
said frame being rotatable to adjust the angle between the longitudinal axis of said beam and the line of action of said second force, thereby to adjust said second moment;
a rotary output shaft;
a linear driving member pivoted at one end on said frame on an axis parallel to and laterally displaced from the pivot axis of the frame; and
means drivably connecting said member and shaft for effecting rotation of said shaft with said frame through an angle related to the angle of rotation of the frame.

3. A force balance instrument comprising:
a balance beam having a fulcrum;
a first force applying means operatively connected to said beam for exerting on the latter a first force which produces a first moment in one direction on the beam;
a pivoted frame mounted for rotation about an axis approximately parallel to the pivot axis of said beam;
a second force applying means operatively connected between said frame and beam for exerting on the latter a second force which produces a second moment on the beam opposing said first moment;
said frame being rotatable to adjust the angle between the longitudinal axis of said beam and the line of action of said second force, thereby to adjust said second moment;
a rotary output shaft;
a linear driving member pivoted at one end on said frame on an axis parallel to and laterally displaced from the pivot axis of the frame; and
means drivably connecting said member and shaft for effecting rotation of said shaft with said frame effecting rotation of the latter with said frame approximately in accordance with the relationship $\phi = K \sin \theta$ where $\phi$ is the angle of rotation of said shaft, $\theta$ is the angle of rotation of said frame, and K is a constant.

4. A force balance instrument comprising:
a balance beam having a fulcrum;
a first force applying means operatively connected to said beam for exerting on the latter a first force which produces a first moment in one direction on the beam;
a pivoted frame mounted for rotation about an axis approximately parallel to the pivot axis of said beam;
a second force applying means operatively connected between said frame and beam for exerting on the latter a second force which produces a second moment on the beam opposing said first moment;
said frame being rotatable to adjust the angle between the longitudinal axis of said beam and the line of action of said force, thereby to adjust said second moment;
a rotary output shaft mounting a pinion; and
a rack pivotally connected to said frame on an axis parallel to and displaced from the pivot axis of the frame and meshing with said pinion for driving said shaft in rotation through an angle related to the angle of rotation of said frame.

5. The subject matter of claim 4 wherein:
said pinion comprises a cam gear which is shaped to effect rotation of said shaft with said frame approximately in accordance with the relationship $\phi = K \sin \phi$ where $\phi$ is the angle of rotation of said shaft, $\theta$ is the angle of rotation of said frame, and K is a constant.

6. A force balancing instrument comprising:
a balance beam having a fulcrum;
a first force applying means operatively connected to said beam for exerting on the latter a first force which produces a first moment in one direction on the beam;
a pivoted frame mounted for rotation about an axis approximately parallel to the pivot axis of said beam;
a second force applying means operatively connected between said frame and beam for exerting on the latter a second force which produces a second moment on the beam opposing said first moment;
said frame being rotatable to adjust the angle between the longitudinal axis of said beam and the line of action of said second force, thereby to adjust said second moment;
a rotary output shaft;
a first eccentric cam gear fixed to said shaft;
a second rotatably mounted, eccentric cam gear meshing with said first gear; and
a link pivoted at one end on said frame in an axis parallel to and laterally displaced from the rotation axis of the frame and at the other end to said second gear on an axis parallel to and laterally displaced from the rotation axis of the latter gear for effecting rotation of said shaft with said frame through an angle related to the angle of rotation of the frame.

7. A force balancing instrument comprising:
a balance beam having a fulcrum;
a first force applying means operatively connected to said beam for exerting on the latter a first force which produces a first moment in one direction on the beam;
a pivoted frame mounted for rotation about an axis approximately parallel to the pivot axis of said beam;
a second force applying means operatively connected between said frame and beam for exerting on the latter a second force which produces a second moment on the beam opposing said first moment;
said frame being rotatable to adjust the angle between the longitudinal axis of said beam and the line of action of said second force, thereby to adjust said second moment;
a rotary output shaft;

a first eccentric cam gear fixed to said shaft;

a second rotatably mounted, eccentric cam gear meshing with said first gear; and a link pivoted at one end on said frame in an axis parallel to and laterally displaced from the rotation axis of the frame and at the other end to said second gear on an axis parallel to and laterally displaced from the rotation axis of the latter gear for effecting rotation of said shaft with said frame approximately in accordance with the relationship $\phi = K \sin \theta$ where $\phi$ is the angle of rotation of said shaft, $\theta$ is the angle of rotation of said frame, and K is a constant.

References Cited by the Examiner

UNITED STATES PATENTS 3,049,007   8/1962   Joline _____ 73—182

LOUIS R. PRINCE, *Primary Examiner.*

D. O. WOODIEL, *Assistant Examiner.*